United States Patent
Clausen et al.

(10) Patent No.: US 7,839,947 B2
(45) Date of Patent: Nov. 23, 2010

(54) CIRCUIT AND METHOD FOR REDUCING THE CREST FACTOR

(75) Inventors: Axel Clausen, München (DE); Werner Henkel, München (DE); Dietmar Sträuβnigg, Villach (AT); Steffen Trautmann, Villach (AT)

(73) Assignee: Lantiq Deutschland GmbH, Neubiberg (DE)

( * ) Notice: Subject to any disclaimer, the term of this patent is extended or adjusted under 35 U.S.C. 154(b) by 852 days.

(21) Appl. No.: 10/559,751

(22) PCT Filed: Jun. 3, 2004

(86) PCT No.: PCT/EP2004/006004

§ 371 (c)(1),
(2), (4) Date: Sep. 18, 2006

(87) PCT Pub. No.: WO2004/110011

PCT Pub. Date: Dec. 16, 2004

(65) Prior Publication Data

US 2007/0099579 A1    May 3, 2007

(30) Foreign Application Priority Data

Jun. 6, 2003    (DE) .............................. 103 25 838

(51) Int. Cl.
*H04L 27/00*    (2006.01)
(52) U.S. Cl. .................... 375/295; 375/296; 375/297; 375/346; 375/260; 370/210; 370/481; 455/75
(58) Field of Classification Search ................ 375/260, 375/346, 295, 297, 296; 370/210, 481; 455/75
See application file for complete search history.

(56) References Cited

U.S. PATENT DOCUMENTS 6,038,261 A    3/2000    Mestdagh (Continued)

FOREIGN PATENT DOCUMENTS

EP    0725510 A1    8/1996

(Continued)

OTHER PUBLICATIONS

Henkel, W. et al., "PAR reduction revisited: an extension to Tellado's method." 6th International OFDM-Workshop, Hamburg, 2001. p. 31-1 to 31-6. (6 pages).

(Continued)

*Primary Examiner*—Sudhanshu C Pathak
(74) *Attorney, Agent, or Firm*—SpryIP, LLC

(57) ABSTRACT

According to the invention, a circuit for reducing the crest factor is provided:
(A) with a transmit path with a data symbol to be transmitted;
(B) with a model path,
which is arranged in parallel with a section of the transmit path,
which exhibits a model filter to which the non-oversampled data symbol to be transmitted can be supplied, the non-oversampled data symbol exhibiting a non-flat PSD power spectrum,
which exhibits an analysis and evaluation circuit which is arranged following the model filter and which checks whether the time domain function of the data symbol to be transmitted exhibits within a predetermined time interval at least one maximum, the amount of which exceeds a first threshold and/or determines the associated position of the maximum within the time interval, and which, by scaling and displacing a dirac-like sample function generates a correction function in dependence on the position and the amplitude of the maximum;

(C) with a subtracting device which is connected to outputs of the model path and of the transmit path and which subtracts the correction function from the data symbol to be transmitted.

12 Claims, 3 Drawing Sheets

U.S. PATENT DOCUMENTS

| | | |
|---|---|---|
| 6,314,146 B1 | 11/2001 | Tellado et al. |
| 6,424,681 B1 | 7/2002 | Tellado et al. |
| 6,512,797 B1 | 1/2003 | Tellado et al. |
| 2003/0026263 A1 | 2/2003 | Taunton |
| 2003/0026332 A1 | 2/2003 | Taunton |
| 2003/0043895 A1 | 3/2003 | Melsa |
| 2004/0156442 A1 | 8/2004 | Clausen |
| 2004/0264508 A1* | 12/2004 | Henkel et al. ............... 370/481 |
| 2006/0115028 A1* | 6/2006 | Schenk ....................... 375/346 |
| 2007/0121736 A1* | 5/2007 | Clausen et al. ............. 375/260 |
| 2008/0043616 A1* | 2/2008 | Clausen et al. ............. 370/210 |

FOREIGN PATENT DOCUMENTS

| | | |
|---|---|---|
| WO | WO 01/82547 A1 | 11/2001 |
| WO | WO 03/026240 A2 | 3/2003 |

OTHER PUBLICATIONS

Salvekar, A.A et al., Peak-to-Average Power Ratio Reduction for Block Transmission Systems in the Presence of Transmit Filtering, IEEE International Conference on Communications, 2001, pp. 175-178.

* cited by examiner

PRIOR ART

CIRCUIT AND METHOD FOR REDUCING THE CREST FACTOR

The invention relates to a circuit and to a method for reducing the crest factor of a data symbol to be transmitted in a multi-carrier data transmission system, in which the data symbol to be transmitted is a function of a multiplicity of signals provided within a predetermined time interval and each of these signals is allocated to a carrier, each carrier occupying in each case at least one frequency from a transmit data spectrum, at least one carrier being reserved which is not provided for the data transmission.

In modern telecommunication, high-bit-rate data transmission on a subscriber line plays an increasingly great role, particularly because it promises greater usable bandwidth of the data to be transmitted, in combination with bidirectional data communication.

A technology increasingly gaining in importance in recent times is the so-called multi-carrier data transmission, also known as "discrete multitone (DMT)" transmission or as "orthogonal frequency division multiplexing (OFDM)" transmission. Such data transmission is used, for example, in line-connected systems but also in the radio domain for broadcast systems and for access to data networks. Such systems for transmitting data with multi-carrier transmission use a multiplicity of carrier frequencies, the data stream to be transmitted being split for the data transmission into many parallel part-streams which are transmitted independently of one another in frequency-division multiplex. These part-streams are also called single carriers.

One representative of multi-carrier data transmission is the ADSL technology, ADSL standing for "asymmetric digital subscriber line". ADSL designates a technology which allows the transmission of a high-bit-rate bit stream from a central station to the subscriber and of a low-bit-rate bit stream leading from the subscriber to a central station. In this technology, the telecommunication line is subdivided into at least one channel for conventional telephone services (that is to say voice transmission) and at least one further channel for data transmission.

Even though very many problems are solved with such multi-carrier data transmission systems such as ADSL, some problems still remain unresolved.

One problem associated with this multi-carrier data transmission results from the fact that due to the superposition of a great number of single carriers, these can briefly add up to very high peak values in the transmit signal. The ratio of peak value to RMS value is called crest factor and its square is called PAR (peak to average ratio). The crest factor can become very large—for example larger than 6—especially in the case of multi-carrier systems such as ADSL. Even if these peak values are very rare in the resultant amplitude and typically only exist for very short periods of time, they represent a great disadvantage of multi-carrier data transmission.

A large crest factor causes various problems in the overall system of data transmission:

The modulation range and the dynamic range and resolution of the maximum possible modulation of the digital/analogue converters and of the analogue circuit components such as filters and line drivers must be designed for the maximum peak values occurring. This means that the circuit components must have much larger dimensions than the RMS modulation. This is associated with a correspondingly high operating voltage which also leads directly to a high power dissipation. This leads to distortion of the signal to be transmitted, particularly in the case of line drivers which generally exhibit a not negligible non-linearity.

A further problem of data transmission with high crest factors consists in it being possible for a very high peak value in the transmit signal to exceed the maximum possible modulation. In this case, clipping of the transmit signal occurs. In these cases, however, the transmit signal no longer represents the original transmit signal sequence so that transmission errors occur.

For this reason, the need exists in such multi-carrier data transmission systems to largely suppress or avoid such peak values. In the literature, this problem is known by the term crest factor reduction or also PAR reduction. There are a number of approaches to solutions for reducing the crest factor:

In one known method, some carriers or carrier frequencies from the multi-carrier data transmission system are reserved (typically about 5% of the spectrum). From these reserved carriers, a time domain function with the highest possible, temporally narrow peak value is generated which forms the correction signal or, respectively, what is known as the kernel. This kernel, which only occupies the reserved carriers, is iteratively weighted with an amplitude factor which is proportional to the difference of the maximum peak value and the desired maximum value and is subtracted from the transmit signal in the time domain. During this process, the kernel is cyclically displaced to the point of the corresponding peak value of the transmit signal which is responsible for the excessive crest factor. The displacement law of the DFT transformation ensures that only the reserved carriers are occupied even after the displacement. Oversampling of the data signal to be transmitted is not provided in this case.

In international patent application WO 03/026240 A2, a method based on the method described above is described in which peak values in the time signal to be transmitted, which are responsible for too high a crest factor, are reduced by iterative calculation of the correction signal. During this process, oversampling of the input signal and modelling of the filters following the circuit for crest factor reduction takes place in order to ensure by this means optimum crest factor reduction and thus high quality data transmission.

The methods described above are based on the existence, manipulation and iterative application of correction signals in the time domain—the so-called kernels. These methods only operate in the time domain and are, therefore, characterized by their speed and low complexity.

The method described in WO 03/026240 A2 provides that, for reliable detection of peak values between samples of the data signal to be transmitted, the highest possible sampling, but at least a 4-fold oversampling of the data signal is performed in order to obtain as good a crest factor reduction as possible. However, increasing oversampling increases the complexity of the circuit for reducing the crest factor which is necessary for ensuring the corresponding performance and speed in the signal processing compared with a method without oversampling.

The method described in WO 03/026240 A2 also provides that, for reducing the crest factor in the case of L-fold oversampling in the model branch, a set of L sample correction functions displaced in time are stored in a memory. This is required because due to the combination of oversampling and filtering with a time displacement in the oversampled pattern, so-called aliasing components falsify the sample correction functions to a certain proportion. These aliasing components are unwanted since they lead to the L sample correction functions not precisely corresponding in their form and not being able to be translated into one another by a cyclic time displacement. In parallel with the set of L sample correction signals on the model path, a corresponding set of corresponding sample correction signals, which are not oversampled, is needed for the operations on the actual signal path. Due to the L-fold oversampling of the data signal to be transmitted on the model path as described above, the crest factor reduction, and thus the quality of data transmission, is improved but this requires additional circuit expenditure which is not justified for many applications.

The present invention is, therefore, based on the object of specifying a method and a circuit for reducing the crest factor which are distinguished by the least possible complexity and at the same time high performance and, nevertheless, ensure the most optimum reduction in crest factor.

According to the invention, these objects achieved by a circuit having the features of claim 1, a multi-mode modem having the features of claim 8 and by two methods having the features of claims 9 and 12.

The present invention is based on the finding that 2-fold oversampling represents an acceptable compromise between complexity and performance, in which peak values can be detected between the individual samples with sufficient reliability and in which the circuit expenditure required for this can be reduced to a minimum. Minimum oversampling with a factor of 4 (L=4) as described in WO 03/026240 A2 is, therefore, not necessarily required which leads to a reduction in the complexity whilst retaining the same performance.

In particular, the present invention relates to multi-carrier data transmission systems according to the ADSL or ADSL+ standard, respectively. In the case of ADSL data transmission, a sampling frequency of 2.208 MHz is used and in the case of ADSL+ data transmission, a sampling frequency of 4.416 MHz is used. In contrast to ADSL, a PSD (power spectral density) mask which is not flat is used in ADSL+. With this non-flat PSD mask in the case of ADSL+, the transmitting power in the upper half of the transmit band is underweighted by up to 20 dB compared with the transmit power in the bottom half of the transmit band. With a non-flat power signal spectrum as used, for example, in an ADSL+ data transmission, a data signal to be transmitted thus has almost the same characteristics as a 2-fold oversampled signal when using a flat PSD power spectrum. In addition, the attenuation in the upper frequency band reduces the influence of the band-limiting low-pass filter on the crest factor of the data signal to be transmitted.

The concept forming the basis of the present invention consists in that, in contrast to the opinion hitherto prevailing in the general technical world, oversampling can be omitted in the case of an ADSL+ data transmission since the transmit signal in any case exhibits the characteristics of a 2-fold oversampled signal in the case of ADSL+. This quite considerably reduces the complexity of the entire circuit for reducing the crest factor whilst retaining the same performance. The corresponding modem at the transmitter for ADSL+ data transmission can thus be produced much more inexpensively in comparison with such a modem which is designed for 4-fold oversampling of the transmit signal.

In a very advantageous embodiment, so-called multi-mode modems can be implemented which are designed both for ADSL operation and for ADSL+ operation. In the case of ADSL, 2-fold oversampling is provided and in the case of ADSL+, no oversampling is provided. The special advantage of this embodiment consists in that the model branch of the circuit for reducing the crest factor can be designed for a single fixed sampling rate. The model filter following the oversampling block can be advantageously set and modified for a single sampling rate.

In a further embodiment, it can also be provided that identical filters with identical filter coefficients are provided. No additional expenditure for setting and adapting the filter coefficients of this model filter would be required. This additionally reduces the implementation expenditure. This considerably reduces the expenditure for implementing such a multi-mode modem.

Reducing the oversampling from four to two in the case of ADSL and dispensing with oversampling in the case of ADSL+ also enables operation with reduced clock rate. As a result, the memory required for storing the sample correction signals also exhibits a correspondingly reduced memory size since only a number of sample correction signals reduced in accordance with the reduction in the sampling rate need to be stored in the memory.

Further savings are obtained if, instead of a number of sample correction signals corresponding to the oversampling (L), only a single sample correction signal is stored in the memory for the model branch. From this stored sample correction signal, the remaining sample correction signals (L-1) are derived by means of cyclic time displacement and scaling in the time domain. In this manner, the entire memory expenditure can be reduced approximately by the factor of oversampling (L).

This procedure only represents an approximation for the L-1 sample correction signals derived in this manner. To reduce an error in the crest factor reduction to a minimum, such dirac-like sample correction functions, the time-displaced variants of which are as similar to one another as possible, are advantageously used for reducing the crest factor, that is to say in which aliasing effects due to a displacement are negligibly low. As a result, the memory expenditure in the model branch, and thus also the entire circuit for reducing the crest factor, can be reduced to a minimum without reducing the performance in the data transmission.

Combined with a fixed sampling rate for the model branch, this results in further simplification for multi-mode modems which are designed both for ADSL and for ADSL+ data transmission. This advantageously results in a constant memory requirement since both the ADSL mode and the ADSL+ mode now only need in each case a single sample correction function of constant length (for example 2*512) for the iterative treatment of the data signal in the model branch. For the iterative treatment on the signal path, the ADSL mode needs two sample correction functions of length 512 and, respectively, the ADSL+ mode only needs a sample correction function of length 1024. In this arrangement, 512 and 1024 designate the number of respective carriers within the predetermined frame of the data signal.

Advantageous embodiment and developments can be found in the subclaims and the description, referring to the drawing.

In the text which follows, the invention will be explained in greater detail by means of the exemplary embodiments specified in the diagrammatic figures of the drawing, in which.

In all the figures of the drawing, identical or functionally identical elements and signals have been designated identically unless otherwise specified.

Figure 1A:
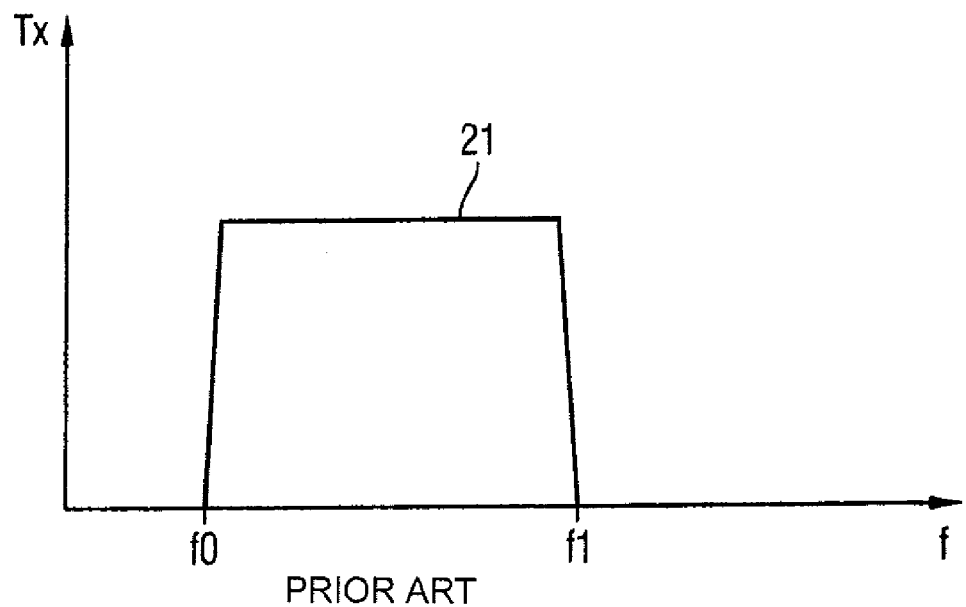
FIG. 1 shows a greatly simplified representation of a PSD mask in the case of ADSL data transmission (a) and in the case of ADSL+ data transmission (b)
Figure 1B:
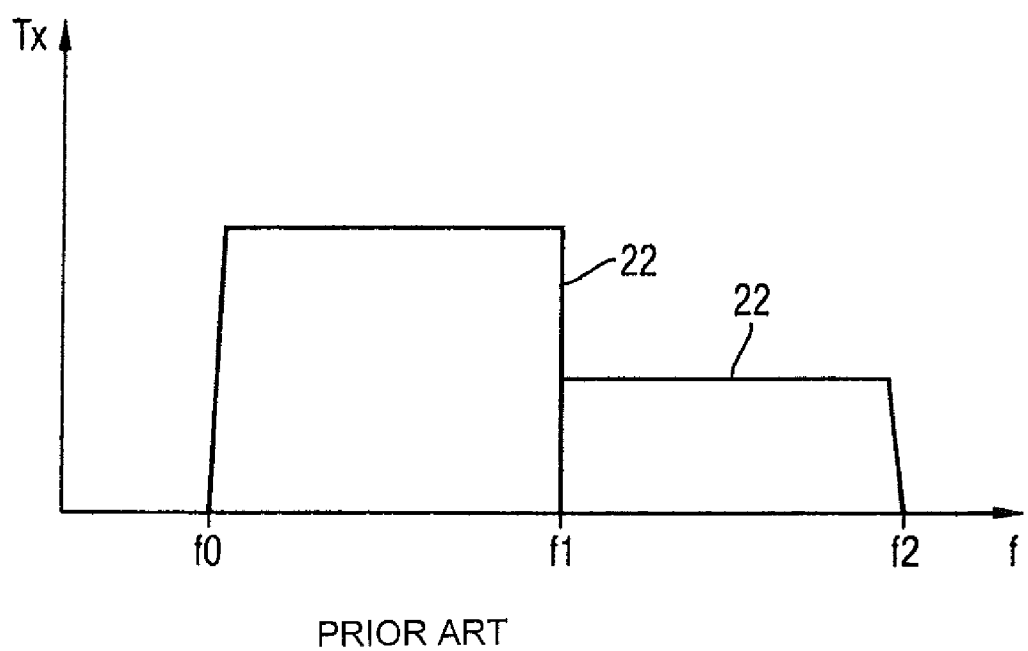

FIG. 1 qualitatively shows two PSD masks such as are used, for example, in a known ADSL data transmission (a) and ADSL+ data transmission (b). PSD (power spectral density) here designates the maximum permissible spectral power density of the transmit signal which is defined by a corresponding standard.

In the case of the PSD mask 21 for ADSL data transmission, a number of carrier frequencies in the range from f0 to f1 are used for the data transmission. This is a flat PSD mask 21 since the transmit power on all carrier frequencies is normalized to a constant value. Although a data transmission according to the ADSL standard exhibits a flat PSD mask 21, this is not necessarily so in all data transmission systems based on multi-carriers. Particularly in the case of ADSL+data transmission, a non-flat PSD mask 22 is used (see FIG. 1 (*b*)). In contrast to the ADSL PSD mask 21, the transmission bandwidth is here increased to frequencies f>f1. This higher-frequency component of the expanded transmit spectrum in the case of ADSL+ extends between frequencies f1-f2. The PSD mask 22 for ADSL specifies a lower power density for the higher-frequency spectrum between f1-f2 compared with the low-frequency spectrum between f0-f1. This results in an overall PSD mask 22 for ADSL+ which virtually has a stepped form, that is to say which is no longer flat.

Figure 2:
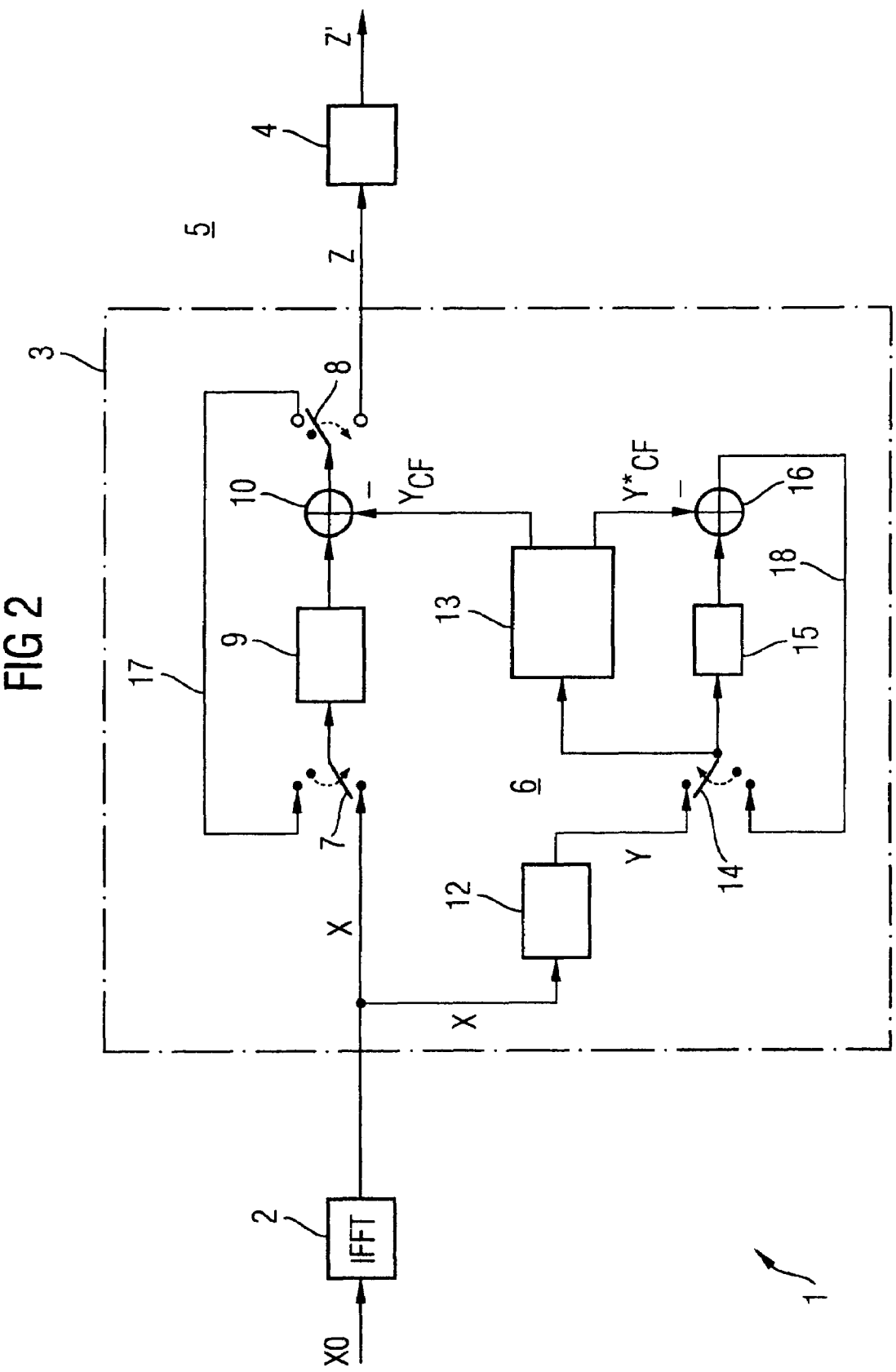
FIG. 2 shows a block diagram of a first exemplary embodiment of the circuit for reducing the crest factor according to the invention for ADSL+ operation.

FIG. 2 shows a block diagram of a first exemplary embodiment of the circuit for reducing the crest factor according to the invention which is designed for ADSL+data transmission.

In FIG. 2, reference symbol 1 designates a section from a multi-carrier data transmission system. With regard to the configuration and operation of such a multi-carrier data transmission system and particularly of a CF circuit, reference is made to WO 03/026240 A2, already mentioned initially, the full content of which is included in the present patent application with regard to the configuration of a multi-carrier data transmission system and particularly to a circuit for reducing the crest factor. FIG. 2 only shows the transmission path 5 at the transmitter end, which path is arranged between a transmitter, not shown, and a hybrid circuit, also not shown, which is connected to the corresponding telephone line.

On the transmit path 5 of the multi-carrier data transmission system, an IFFT module 2, a circuit arrangement for reducing the crest factor 3 and an output filter 4 are arranged in succession. The IFFT module 2 is supplied by the transmitter with an input signal X0 which is modulated by the IFFT module 2 by means of an inverse Fourier transform. The input signal X thus modulated is supplied to the downstream CF circuit 3. The CF circuit 3 generates a crest-factor-reduced output signal Z which is supplied to the downstream output filter 4. After the filtering of the crest-factor-reduced output signal Z, the filter 4 outputs a signal Z' which is still crest-factor-reduced.

For this purpose, the CF circuit 3 has a model path 6 which is arranged in parallel with a section of the transmit path 5. The model path 6 branches away from the transmit path 5 at the input of the CF circuit 3 so that the model path 6 is also supplied with the modulated input signal X. This signal X is initially supplied to a model filter 12. The model filter 12 is as accurate as possible a replica of the filter 4 or filter chain following the CF circuit 3. This takes into account of the characteristic of the filter 4 and its influence on the signal X to be transmitted. It is thus possible to ensure that, although the output signal Z has been changed by the output filter 4 and there is thus a possibility of repeated generation of an excessive crest factor, the filtered output signal Z' still does not exhibit any excessive peak values.

Oversampling does not take place in the CF circuit 3 in FIG. 2 since, in the case of ADSL+ data transmission, the transmit signal X in any case has the characteristic of a 2-fold oversampled signal due to the non-flat structure of the PSD mask 22 (see FIG. 1 (*b*)), and it has been found according to the invention that such oversampling is sufficient for the purpose of reducing the crest factor.

The model filter 12 is followed by an analysis and evaluation unit 13 which checks the filtered signal Y to see whether a peak value is present within a predetermined time interval. It is checked whether the amount of the signal Y exceeds a predetermined threshold. If the amount of the amplitude of the signal Y exceeds this threshold, the existence of a peak value, and thus of an excessive crest factor is inferred which has to be reduced. In this case, the analysis and evaluation unit 13 also determines the relative position in time and the value of the amplitude of this peak value within the time interval.

The analysis and evaluation unit 13 is advantageously constructed as program-controlled unit, particularly as microprocessor or microcontroller.

The method for used for searching for a peak value and its position in time within a time interval corresponds to the method described in WO 03/026240 A2. The full content of this printed document is also included in the present patent application with regard to this method.

The analysis and evaluation unit 13 typically also contains a memory unit in which the sample correction functions are stored. These sample correction functions are time vectors, for example dirac-like functions from which the corresponding correction function $Y_{CF}$ is formed by scaling and displacement. If the analysis and evaluation unit 13 has detected a peak value, it outputs a dirac-like correction signal $Y_{CF}$.

In an adding device 10 following the analysis and evaluation unit 13, the transmit signal X, which is suitably delayed in time, is superimposed on the prescaled correction signal $Y_{CF}$ which is already displaced on the transmit path 5. The superposition is effected, for example, by subtracting the correction signal $Y_{CF}$ from the corresponding part of the time-domain signal X in the adding device 10.

In FIG. 2, feedback paths 17, 18 are also provided on the transmit path 5 and model path 6. The feedback paths 17, 18 on the transmit path 5 and model path 6 and the switches 7, 8, 14 arranged on these paths 5, 6 are used for the iterative treatment of the respective signals.

For the iterative treatment of the input signals X, the transmit path 5 contains a first switch 7 (start), a second switch 8 (stop), a buffer 9 arranged between these switches 7, 8 and an addition device 10. The buffer device 9 is used for buffering, i.e. delaying the time-domain signal X supplied at the input, in order to take into account a time delay on the model path 6, and for storing the respective intermediate values from the iteration.

For the iterative treatment of the signals Y on the model path 6, a first switch 14 (start), a buffer device 15 and an adding device 16 are provided. The analysis and evaluation unit 13 also supplies the correction signal $Y^*_{CF}$ to the adding device 16 in which the correction signal $Y^*_{CF}$ is subtracted from the time-domain signal Y on the model path 6. This results in the second iteration loop 18.

Figure 3:
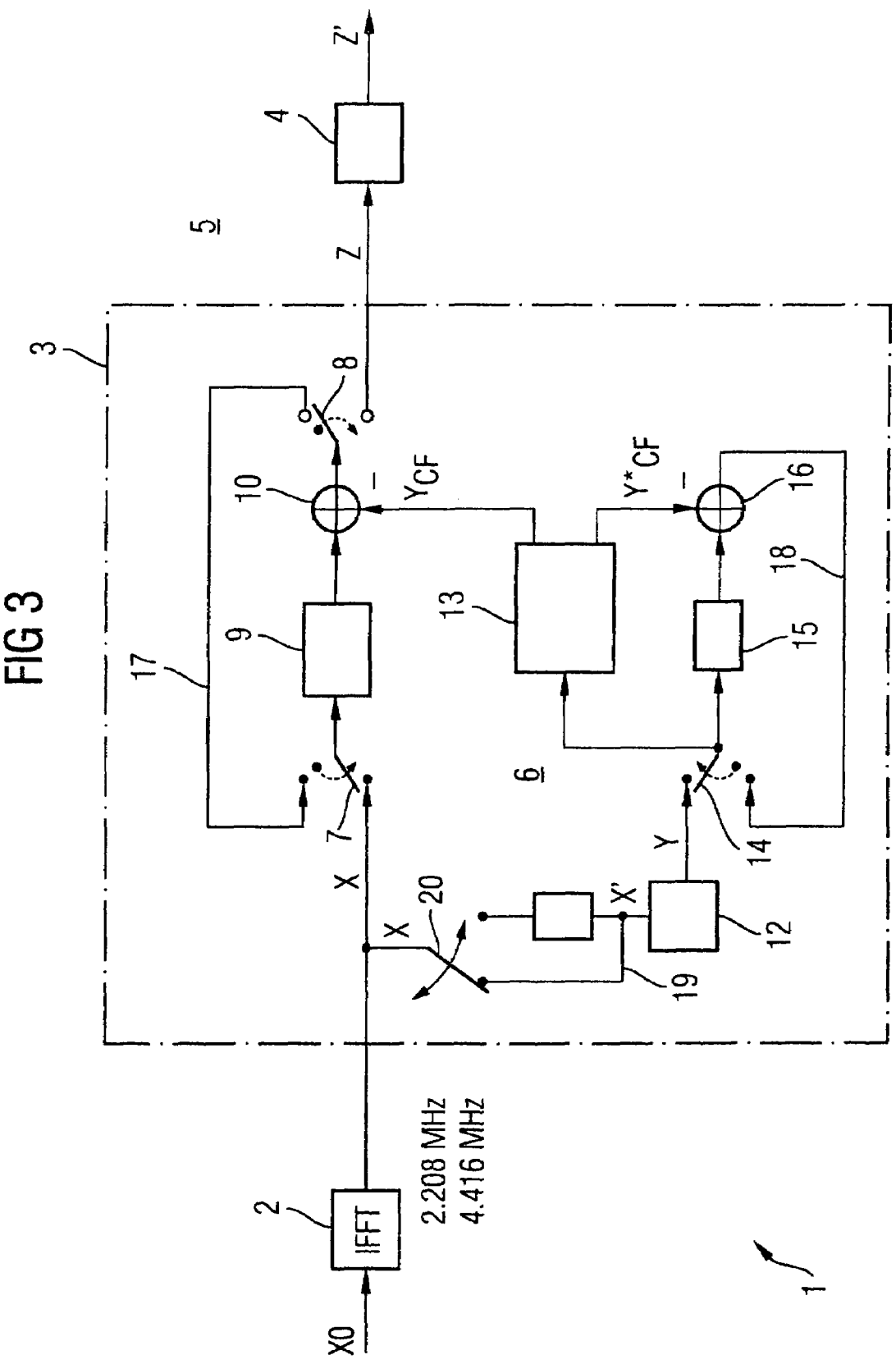
FIG. 3 shows a block diagram of a second, particularly preferred exemplary embodiment of the circuit for reducing the crest factor according to the invention for a multi-mode modem.

FIG. 3 shows a block diagram of a second, particularly preferred exemplary embodiment of the circuit for reducing the crest factor according to the invention.

In contrast to the exemplary embodiment in FIG. 2, a CF circuit 3 designed for a multi-mode modem at the transmitter end is provided in FIG. 3 and is designed both for ADSL operation and for ADSL+ operation. In the case of ADSL data transmission, the sampling frequency is 2.208 MHz and in the case of ADSL+ data transmission, the sampling frequency is 4.416 MHz. In the exemplary embodiment in FIG. 3, an oversampling unit 12 is provided on the model path 6. This oversampling unit 11 precedes the model filter 13. The input of the oversampling unit 11 is supplied with the data signal to be transmitted. The correspondingly oversampled data signals X' are supplied by the oversampling unit 11 to the downstream model filter 12. 2-fold oversampling is provided. This 2-fold oversampling is required in the case of ADSL data transmission in order to positively detect the corresponding peak values between the individual samples. In the case of ADSL+ data transmission, such 2-fold oversampling is not required due to the non-flat structure of the PSD mask 21 (see FIG. 1 (a)). For this reason, a bypass unit 19 is also provided by means of which the oversampling unit 11, and thus the 2-fold oversampling, can be bypassed.

Depending on whether the CF circuit 3 is to be operated in ADSL mode or in ADSL+ mode, the data signal X is switched to the oversampling unit 11 or to the bypass unit 19 by means of a switching device 20. The particular advantage of the CF circuit 3 shown in FIG. 3 consists in that the sampling rate and advantageously also the corresponding coefficients of the model filter 12 are already adapted both to ADSL operation and to ADSL+ operation, and thus do not need to be set specifically for the different operating modes of the modem. This makes it possible to reduce the circuit expenditure to a minimum.

Although the present invention has been described above by means of preferred exemplary embodiments, it is not restricted to these but can be modified in many ways.

In particular, the invention is not restricted to the above data transmission systems and methods but can be expanded, for the purpose of crest factor reduction, to all systems and methods based on multi-carrier data transmission. In particular, the invention shall not be restricted to ADSL or ADSL+ data transmission but can be expanded to all xDSL data transmission systems. Mobile applications such as DAB (digital audio broadcasting), DVB-T (digital video broadcasting-terrestrial) or OFDM-based WLAN (wireless local area network) applications are also conceivable.

Naturally, the elements of the circuit for reducing the crest factor and the specified IFFT modules and filters are conventional hardware components which, however, can also be implemented in software.

Instead of an IFFT, any other transformations suitable for multi-carrier transmission can also be used.

In addition, the invention shall not necessarily be restricted to 2-fold or 4-fold oversampling of the data signal to be transmitted. Instead, it can also be provided that no oversampling, or even subsampling or oversampling of any degree takes place here.

In particular, the invention shall not be restricted to the above numerical information but can be arbitrarily modified within the framework of the invention and of expert knowledge.

The invention claimed is:

1. A circuit for reducing the crest factor of a data symbol to be transmitted in a multi-carrier data transmission system, the data symbol being a function of a plurality of signals provided within a predetermined time interval, each of the plurality of signals allocated to a carrier, each carrier occupying at least one frequency from a transmit data spectrum, at least one carrier being reserved which is not provided for data transmission, the circuit comprising:

a transmit path configured to receive the data symbol;
a model path arranged in parallel with a section of the transmit path the model path comprising:
a model filter configured to receive at least periodically the data symbol in non-oversampled format, the non-oversampled data symbol exhibiting a non-flat PSD power spectrum;
an analysis and evaluation circuit arranged following the model filter and configured to determine whether the time domain function of the non-oversampled data symbol, filtered by the model filter and exhibits within a predetermined time interval at least one maximum which exceeds a first threshold, and further configured to determine an associated position of the maximum within the time interval, and, by scaling and displacing a dirac-like sample function, to generate a correction function in dependence on the associated position and an amplitude of the maximum; and
a combining device which is connected to the model path and the transmit path, the combining device configured to subtract the correction function from the non-oversampled data symbol on the transmit path;
wherein the model path further comprises an oversampling device operably coupled to the model filter, and a bypass device configured to selectively bypass the oversampling device.

2. The circuit according to claim 1, wherein the model path further comprises a switching device configured to selectively cause the bypass device to bypass the oversampling device.

3. The circuit according to claim 1, wherein the oversampling device is configured to perform a two-fold oversampling of the data symbol.

4. The circuit according to claim 1, wherein the model filter is configured to have filter coefficients that are identical for data symbols supplied to the model filter via the oversampling device and for data symbols supplied to the model filter via the bypass device.

5. The circuit according to claim 4, wherein the model filter comprises a non-recursive filter which has a characteristic of a filter following the circuit for reducing the crest factor.

6. A multi-mode modem for a multi-carrier data transmission system, which includes a circuit for reducing the crest factor of a data symbol to be transmitted in a multi-carrier data transmission system, the data symbol being a function of a plurality of signals provided within a predetermined time interval, each of the plurality of signals allocated to a carrier, each carrier occupying at least one frequency from a transmit data spectrum, at least one carrier being reserved which is not provided for the data transmission, the circuit comprising:

a transmit path configured to receive the data symbol;
a model path arranged in parallel with a section of the transmit path the model path comprising
a model filter configured to receive the data symbol in non-oversampled format,
an oversampling device operably coupled to an input of the model filter, and a bypass device configured to selectively bypass the oversampling device.
an analysis and evaluation circuit arranged following the model filter and configured to determine whether the time domain function of the non-oversampled data symbol, filtered by the model filter and exhibits within a predetermined time interval at least one maximum which exceeds a first threshold, and further configured to determine an associated position of the maximum within the time interval, and, by scaling and displacing a dirac-like sample function, to generate a correction function in dependence on the associated position and an amplitude of the maximum; and a combining device which is connected to the model path and the transmit path, the combining device configured to subtract the correction function from the non-oversampled data symbol on the transmit path; and modem circuitry configured to transmit the corrected data symbol, which exhibits a power density spectrum according to a PSD mask both according to the ADSL standard and according to the ADSL standard.

7. A method for reducing the crest factor of a data symbol to be transmitted using a circuit in a multi-carrier data transmission system, the data symbol being a function of a plurality of signals provided within a predetermined time interval, each of the plurality of signals allocated to a carrier, each carrier occupying at least one frequency from a transmit data spectrum, at least one carrier being reserved which is not provided for the data transmission, the circuit comprising:

a transmit path configured to receive the data symbol;

a model path arranged in parallel with a section of the transmit path the model path comprising:

a model filter configured to receive the data symbol;

an oversampling device operably coupled to an input of the model filter, and a bypass device configured to selectively bypass the oversampling device;

an analysis and evaluation circuit arranged following the model filter and configured to determine whether the time domain function of the non-oversampled data symbol, filtered by the model filter and exhibits within a predetermined time interval at least one maximum which exceeds a first threshold, and further configured to determine an associated position of the maximum within the time interval, and, by scaling and displacing a dirac-like sample function, to generate a correction function in dependence on the associated position and an amplitude of the maximum;

a combining device which is connected to the model path and the transmit path, the combining device configured to subtract the correction function from the non-oversampled data symbol on the transmit path, the method comprising:

oversampling the data symbol two-fold and providing the oversampled data symbol to the model filter when the data symbol is part of an ADSL data transmission; and providing data symbol in non-oversampled format to the model filter when the data symbol is part of an ADSL+ data transmission.

8. A method according to claim 7, wherein filter operations of the model filter are performed with a single sampling rate for both oversampled data symbols and non-oversampled data symbols.

9. A method according to claim 8, further comprising using correction functions of constant length for the data symbol that is part of the ADSL data transmission and for the data symbol that is part of the ADSL+ data transmission.

10. A method according to claim 7, further comprising using correction functions of constant length for the data symbol that is part of the ADSL data transmission and for the data symbol that is part of the ADSL+ data transmission.

11. A method for reducing the crest factor of a data symbol using a circuit in a multi-carrier data transmission system, the data symbol being a function of a plurality of signals provided within a predetermined time interval, each of the plurality of signals allocated to a carrier, each carrier occupying in each case at least one frequency from a transmit data spectrum, at least one carrier being reserved which is not provided for the data transmission, the circuit comprising:

a transmit path configured to receive the data symbol;

a model path arranged in parallel with a section of the transmit path the model path comprising:

a model filter configured to receive the data symbol;

an oversampling device operably coupled to an input of the model filter, and a bypass device configured to selectively bypass the oversampling device;

an analysis and evaluation circuit arranged following the model filter and configured to determine whether the time domain function of the non-oversampled data symbol, filtered by the model filter and exhibits within a predetermined time interval at least one maximum which exceeds a first threshold, and further configured to determine an associated position of the maximum within the time interval, and, by scaling and displacing a dirac-like sample function, to generate a correction function in dependence on the associated position and an amplitude of the maximum;

a combining device which is connected to the model path and the transmit path, the combining device configured to subtract the correction function from the non-oversampled data symbol on the transmit path, the method comprising:

using L-fold oversampling of the data symbol on the model path;

storing, for the model path, only a single sample correction signal for reducing the crest factor; and deriving a remaining L-1 sample correction signals using cyclic time displacement and scaling in the time domain.

12. The method according to claim 11, further comprising selecting dirac-like sample correction signals having time-displaced variants with substantially similar aliasing for reducing the crest factor.

* * * * *